Figure 1:
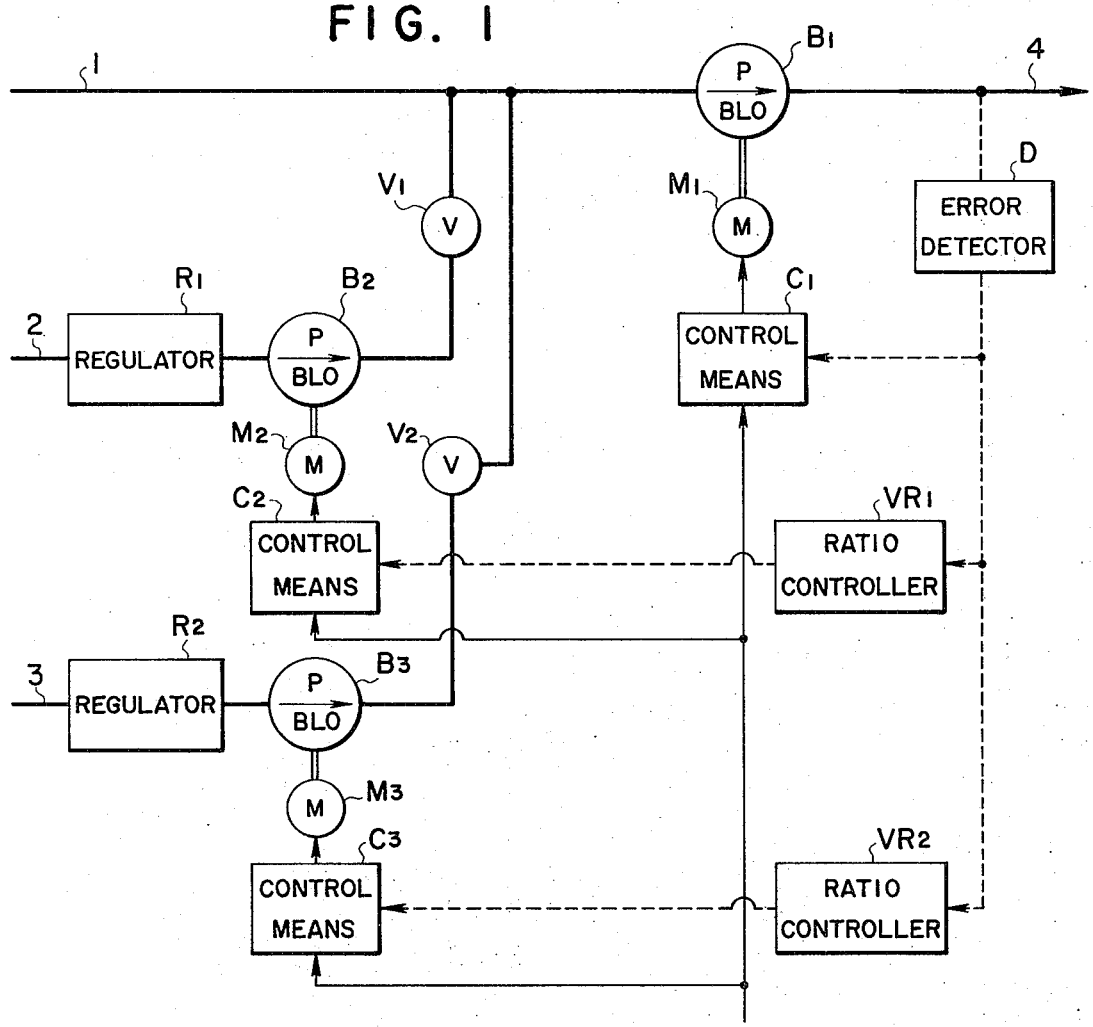

United States Patent [19]
Murase

[11] 3,817,658
[45] June 18, 1974

[54] FLUID CONTROL APPARATUS
[75] Inventor: Sigeru Murase, Tokyo, Japan
[73] Assignee: Tokyo Netsushori Kogyo Kabushiki Kaisha, Yokohama-shi, Japan
[22] Filed: Mar. 20, 1972
[21] Appl. No.: 236,374

[30] Foreign Application Priority Data
Mar. 22, 1971  Japan................................ 46-16310
July 10, 1971  Japan................................ 46-51354

[52] U.S. Cl............................ 417/2, 137/7, 137/88, 417/5
[51] Int. Cl...................... F04b 41/06, G05d 11/035
[58] Field of Search.............. 137/7, 88; 417/2, 5, 6, 417/43

[56] References Cited
UNITED STATES PATENTS

| | | | |
|---|---|---|---|
| 1,452,265 | 4/1923 | Collins et al. | 137/7 |
| 1,807,328 | 5/1931 | Warren | 417/5 |
| 1,961,350 | 6/1934 | Grunsky | 417/2 X |
| 2,671,462 | 3/1954 | Grier | 137/88 |
| 3,072,058 | 1/1963 | Christopher et al. | 417/2 X |
| 3,250,218 | 5/1966 | Sinclair | 137/88 X |
| 3,584,977 | 6/1971 | Coleman et al. | 417/2 X |

Primary Examiner—Carlton R. Croyle
Assistant Examiner—Richard Sher

[57] ABSTRACT

Fluid control apparatus comprises main fluid pumping means for receiving fluids from a basic input system and at least one additional input system and for feeding the fluids in mixture to an output system, auxiliary fluid pumping means associated with the additional input system, first control means is provided for detecting a deviation between the pressure prevailing in the output system and a setpoint pressure to thereby control the number of revolutions of the main pumping means in order to keep the output pressure thereof constant, second control means being provided for varying the number of revolutions of the auxiliary fluid pumping means, as a function of the number of revolutions of the main pumping means, to provide fluid flow rates which for a given number of revolutions of the main fluid pumping means will provide a constant pressure at the output system. By virtue of this control the fluid in the basic input system and that in the additional input system may be admixed in predetermined proportions while maintaining the mixture at a constant output pressure.

7 Claims, 4 Drawing Figures

3,817,658

FLUID CONTROL APPARATUS

The invention relates to a fluid control apparatus, and more particularly to such apparatus which mixes multi-fluids in predetermined proportions and feeds the mixture at a given pressure.

Mixing multi-fluid at predetermined proportions and maintaining the pressure of the mixture constant is desired in various fields of industry. However, there is known no method of carrying out such control with desired accuracy, nor apparatus which performs such function automatically. This precluded from wide spread use metallurgical treatments of metals in a gas atmosphere furnace, such as cementation and nitriding treatment, which have recognized usefulness. British patent No. 1,034,157 describes a nitriding method with gas, in which it is has been observed that the proportions in which a mixture of gas is supplied to an atmospheric pressure operated furnace for metallurgical treatment of metal has critical bearing upon the quality of the product. In addition, as noted in the noted patent, the use of an explosive gas such as ammonia involves operational hazards unless the mix proportions are correctly controlled.

Therefore, it is an object of the invention to provide a fluid control apparatus capable of automatically controlling the proportions of a fluid mix for maintaining the pressure of the mixture constant.

Another object of the invention is to provide a fluid control apparatus which is simple in construction and operation.

In accordance with the invention, there is provided a fluid control apparatus comprising main fluid pumping means for receiving fluids at its input from a basic input line and at least one other input line and for feeding the fluids in mixture to an output line at constant pressure, said main rotary pumping means being rotatable at a variable number of revolutions and for predetermined numbers of revolutions thereof having predetermined fluid flow rates therethrough for maintaining the pressure in the output line constant, auxiliary pumping means for the other input line for pumping fluid therethrough to the input of said rotary pumping means, error detector means operative to detect a deviation between the pressure in the output system and a set-point pressure for controlling the number of revolutions of the main pumping means, a second control means operative under control of said error detector means for controlling the number of revolutions of the auxiliary pumping means to provide fluid flow rates which at the controlled number of revolutions of the main pumping means to ensure a constant mixture proportion and a constant output pressure of the mixture at the output line.

Figure 2:
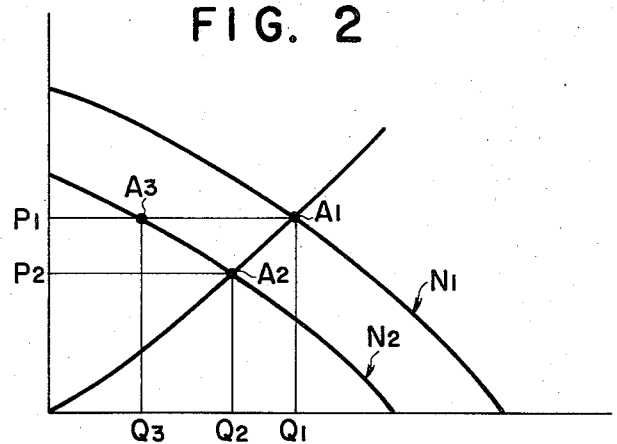
Figure 3:
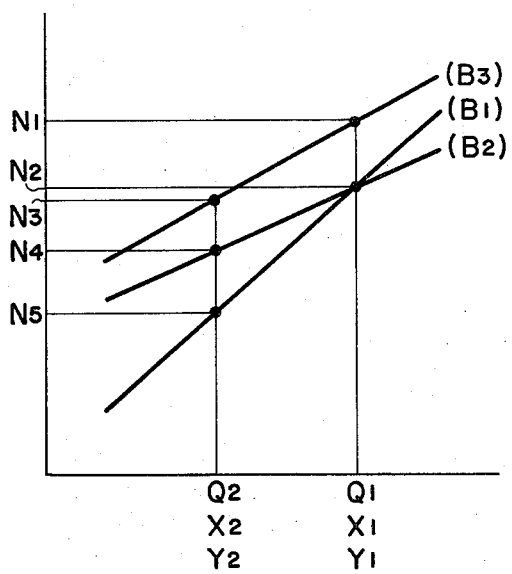
Figure 4:
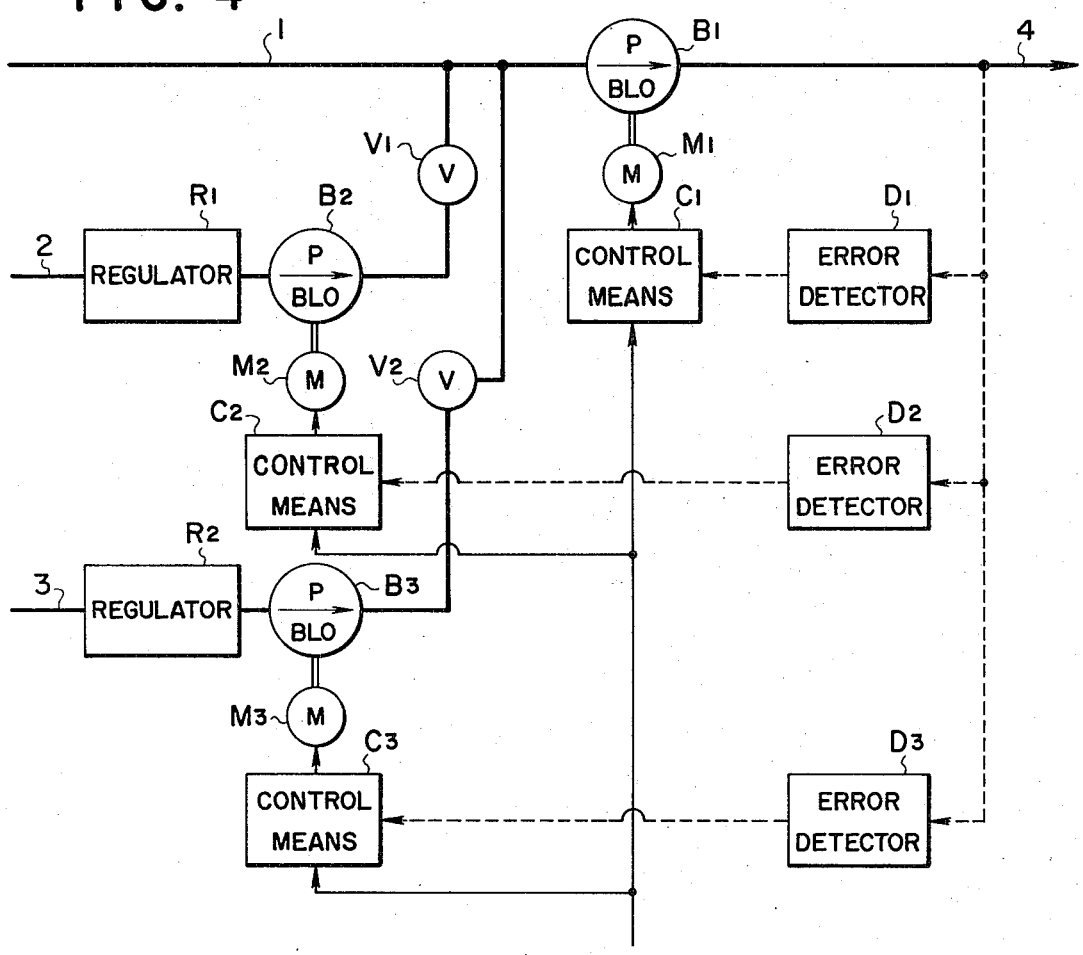

Other objects, features and further detail of the invention will become apparent as the description proceeds with reference to the drawings, in which:

FIG. 1 is a schematic block diagram of an embodiment of the fluid control apparatus according to the invention, FIG. 2 graphically shows the known relation between the pressure and the flow rate of a pump or blower with the number of revolutions taken as a parameter, FIG. 3 graphically illustrate the relationship between the number of revolutions and the flow rate of the respective pumps or blowers shown in FIG. 1, and FIG. 4 is a schematic block diagram of another embodiment of the fluid control apparatus according to the invention.

Referring to FIG. 1, there is shown a block diagram of the fluid control apparatus according to the invention. In this Figure, thick lines represent a fluid system, thin solid lines a drive system, and broken lines a control system. The fluid system is applicable to either liquid or gas, and the following description is given for a gas system by way of an example.

The fluid control apparatus includes a main blower $B_1$ which receives fluids from a basic input system 1 and from additional input systems 2 and 3 and feeds these fluids to a single output system 4. The number of additional input systems can be chosen as desired. Each of the additional input systems 2 and 3 is associated with an auxiliary blower $B_2$ or $B_3$, respectively, for feeding the fluids therefrom to the main blower $B_1$. These auxiliary blowers $B_2$ and $B_3$ are preceded by regulators $R_1$ and $R_2$, respectively, which remove external disturbances to the respective fluids from their associated input sources and maintain these fluid substantially at constant pressures. These regulators are well known in the art and are available, for example, from North American Manufacturing Company in the United States as type No. 7216 or 7218. In the embodiment shown in FIG. 1, the basic input system receives air under atmospheric pressure which removes the need for a regulator, but where it receives a gas vulnerable to external disturbances, it is desirable to have a regulator therein as in the additional input systems 2 and 3. Regulating valves $V_1$ and $V_2$ are interposed between the main blower $B_1$ on one side and the blowers $B_2$ and $B_3$, respectively, on the other side, and serve for supplying predetermined quantities of fluid from the additional input systems 2 and 3 for admixture with the fluid from the basic input system 1. The amount of fluid supplied through valves $V_1$ and $V_2$ is established on start-up of the apparatus and remains substantially unchanged during operation.

The provision of the auxiliary blowers $B_2$ and $B_3$ in the additional input systems 2 and 3, separately from the main blower $B_1$, represents one of the features of the invention. The apparatus operates to maintain the pressure in the output system 4 or the discharge pressure of the main blower $B_1$ constant while maintaining the proportion of the fluid supplied from the additional input systems 2 and 3 fixed in relation to the fluid supplied from the basic input system 1, by simultaneously varying, for any required variation in the flow rate through the main blower, occasioned by a change in the number of revolutions thereof, the flow rate of the fluid through the auxiliary blowers $B_2$ and $B_3$. Before further proceeding with the description of the apparatus, reference is made to FIGS. 2 and 3.

FIG. 2 is useful for explaining the principles of the invention and graphically shows the pressure versus flow rate of a pump or blower, known as characteristic curves, with varying number of revolutions $N_1$ and $N_2$. The ordinate represents the pressure (P) and the abscissa represents the flow rate (Q). Assume that the pump or blower first operates at point $A_1$ at revolutions $N_1$ and then at revolutions $N_2$, the operating point for revolution $N_2$ will be seen to be shifted to point $A_2$ where the flow rate changes to $N_2/N_1$ times the initial value $P_1$, or $P_2$, and the pressure changes to $(N_2/N_1)^2$ times the initial value $Q_1$, or $Q_2$. Hence to maintain the pressure constant; i.e. at the initial value $P_1$, the operating point must be shifted to point $A_3$ on the curve $N_2$. It is therefore seen from FIG. 2 that the pressure $P_1$ can be maintained constant by changing the number of revolutions. This indicates that the discharge pressure of the main blower $B_1$ can be maintained constant by providing a feedback control for controlling the number of revolutions of blower $B_1$. However, it will be appreciated from FIG. 2 that changing the number of revolutions also requires for maintaining the pressure constant a change in the flow rate, which leads to the necessity of a corresponding simultaneous control of the flow rates of the fluid through the auxiliary blowers $B_2$ and $B_3$ in order to maintain a fixed ralationship between their flow rates and that of the main blower $B_1$. This is achieved by varying the number of revolutions of the blowers $B_2$ and $B_3$. Denoting the flow rate of the output system 4 or the main blower $B_1$ as Q and the flow rates of the additional input systems 2 and 3 or the auxiliary blowers $B_2$ and $B_3$ as X and Y, respectively, the flow rate from the basic input system 1 is given by the following equation:

$$Z = Q - X - Y$$

Thus it is apparent from FIG. 3 that if the flow rates X and Y of the auxiliary blowers $B_2$ and $B_3$ can be controlled constant with respect provide a flow rate Q of the main blower $B_1$ for a given number of revolutions of $B_1$ to maintain the output pressure constant, the proportion of mixed fluids as fed from the respective input systems 1, 2 and 3 can also be maintained constant. For this reason, the basic input system 1 does not require an auxiliary blower, which however may be provided if desired.

According to the invention, the discharge pressure of the main blower $B_1$ is maintained constant by varying the number of revolutions of and the flow rate through the main blower. The required flow rate for a given rpm of blower $B_1$ to maintain the output pressure constant is ensured by auxiliary blowers $B_2$ and $B_3$ which operate in such manner that the rate of change in the fluid flow rates therethrough are in a variable ratio to the required change in the fluid flow rate through the main blower $B_1$ to maintain the output pressure constant. Stated differently, the change in the number of revolutions of each of the auxiliary blowers $B_2$ and $B_3$, occasioned by a signal from the error detector, is such that the fluid flow rate through the main blower, at the prevailing number of revolutions of the main blower, will maintain a constant mixture proportion and output pressure constant. The number of revolutions of the auxiliary blower $B_2$ or $B_3$ in relation to the main blower $B_1$, to ensure fluid flow rates for constant output pressure, is determined by the slopes of the curves in FIG. 3, each of which is a plot of rpm vs. flow rate. It will be appreciated that a calibration curve may be obtained which establishes a relationship between the number of revolutions and the flow rate for each of the blowers $B_1$, $B_2$ and $B_3$ for maintaining a rate of flow through $B_1$ at a value to provide for a given rpm thereof a constant pressure at the output thereof. The relative flow rates for each blower may be determined from such curves.

FIG. 3 shows exemplary calibration curves for the main blower $B_1$ and the auxiliary blowers $B_2$ and $B_3$ which may be resorted to for obtaining a fixed ratio of flow rates. The ordinate represents the number of revolutions and the abscissa the flow rate for each of the blowers. Assume now that the main blower $B_1$ and the auxiliary blower $B_2$ are both operating at revolutions $N_2$ and the other auxiliary blower $B_3$ at revolutions $N_1$. Assume further that the main blower has a flow rate of Q, and that the auxiliary blowers $B_2$ and $B_3$ have flow rates of $X_1$ and $Y_1$, respectively. If the number of revolutions of the main blower $B_1$ changes to $N_5$, and assuming for constant discharge pressure a required change in the flow rate to $Q_2$, this is accomplished by changing the same flow rate of the auxiliary blowers $B_2$ and $B_3$ from $X_1$, $Y_1$ to $Y_2$, $X_2$, respectively, by changing the number of their revolutions from $N_2$, $N_1$ to $N_4$, $N_3$, respectively. This can be accomplished by determining the relative rates of changes in the number of revolutions, $N_2-N_4$ and $N_1-N_3$ of the auxiliary blowers $B_2$ and $B_3$ with respect to a change $N_2-N_5$ in the number of revolutions of the main blower $B_1$, and controlling the number of revolutions of the respective blowers in accordance with this relative rate.

Returning to FIG. 1 for continued description of the fluid control apparatus of the invention, each of the blowers $B_1$, $B_2$ and $B_3$ is driven by drive means $M_1$, $M_2$ or $M_3$, respectively, which may be alternators, d.c. motors or pneumatic motors. The number of revolutions of these drive means are controlled by control means $C_1$, $C_2$ and $C_3$, respectively, which may be either motor speed controls, pneumatic pressure controls or solenoid valves. The drive means together with its associated control means constitutes a variable speed drive unit.

In the embodiment shown in FIG. 1, each of the control means $C_1$, $C_2$ and $C_3$ receives a control signal from pressure error detecting means D located in a point of the fluid output system 4, and controls its associated drive means $M_1$, $M_2$ or $M_3$ in accordance with the control signal. The pressure error detecting means may be a pressure transducer capable of comparing the pressure in the output system 4 with a set-point reference pressure and producing an electrical signal for any resulting deviation. Such pressure transducers are well known, and one is available, for example, from Fuji Denki Seizo Kabushiki Kaisha in Japan as type FCT. In accordance with the invention, rate controllers $VR_1$ and $VR_2$ are interposed between the detecting means D and the control means $C_2$ and $C_3$, respectively. Such rate controllers may be variable resistors which introduce inputs of differential magnitudes to the control means $C_2$ and $C_3$ in response to an error signal of given magnitude, thereby establishing a desired relative rate of inputs to the control means $C_1$, $C_2$ and $C_3$ to change thereby the number of revolutions of the respective blowers to ensure fluid flow rates which for a given rpm of blower $B_1$ will provide a uniform output pressure in output line 4.

Alternatively, the use of rate controllers may be avoided by incorporating control means constructed such that they control the number of revolutions of the blowers $B_1$, $B_2$ and $B_3$ at different rates in response to an error signal of given magnitude.

FIG. 4 shows another embodiment of the invention for a mechanical version of control. Drive means $M_1$, $M_2$ and $M_3$ are pneumatic motors and control means $C_1$, $C_2$ and $C_3$ are valves which control the air pressure supplied to the motors. The number of revolutions of a pneumatic motor is known to be proportional to the air pressure supplied thereto, and hence constitutes, together with an automatic control of air pressure afforded by a valve, a variable speed drive unit applicable to the invention. Again, the control is based on a pressure deviation in the output system 4 from a set-point reference pressure. In this instance, three separate detecting means $D_1$, $D_2$ and $D_3$ are shown connected with the output system to feed control means $C_1$, $C_2$ and $C_3$, respectively so as to control the number of revolutions of the blowers $B_1$, $B_2$ and $B_3$ at given rates. While the control means is shown separately from the detecting means, they may be combined together as a variable rate fluid regulator of type 7216 mentioned before.

What is claimed is:

1. Fluid control apparatus comprising main fluid rotary pumping means for receiving fluids at its input from a basic input line and at least one other input line and for feeding fluids in a constant proportion mixture to an output line at constant pressure, said main rotary pumping means being rotatable at a variable number of revolutions and for predetermined numbers of revolutions thereof having predetermined fluid flow rates therethrough for maintaining the pressure in the output line constant, auxiliary pumping means in the other input line for pumping fluid therethrough to the input of said rotary pumping means error detector means operative to detect a deviation between the pressure in the output system and a set-point pressure for controlling the number of revolutions of the main pumping means, and second control means operative under control of said error detector means for controlling the number of revolutions of the auxiliary pumping means to provide fluid flow rates which at the controlled number of revolutions of the main pumping means ensure a constant mixed proportion and output pressure of the mixture at the output line.

2. Fluid control apparatus according to claim 1, in which both main and auxiliary pumping means comprise rotary blowers.

3. Fluid control apparatus according to claim 1, in which both main and auxiliary pumping means comprise rotary pumps.

4. Fluid control apparatus according to claim 1, further including a valve interposed between the main pumping means and the auxiliary pumping means.

5. Apparatus according to claim 1, in which said error detector means includes means for producing an electrical output in response to a deviation between the pressure prevailing in the output system and a set-point pressure, and in which the second control means includes ratio controller means supplied with the electrical output from the error detector means for changing the number of revolutions of the auxiliary pumping means.

6. Fluid control apparatus according to claim 5, in which the electrical output from the ratio controller means is at a variable rate.

7. Apparatus according to claim 1, in which said error detector means includes means which provides a mechanical output in response to detection of a deviation between the pressure in the output system and a set-point pressure.

* * * * *